United States Patent Office 3,332,009
Patented July 18, 1967

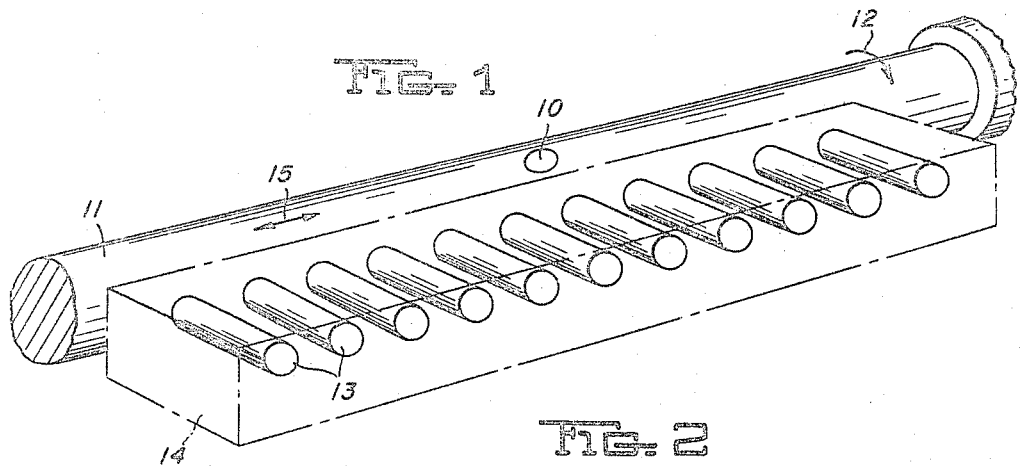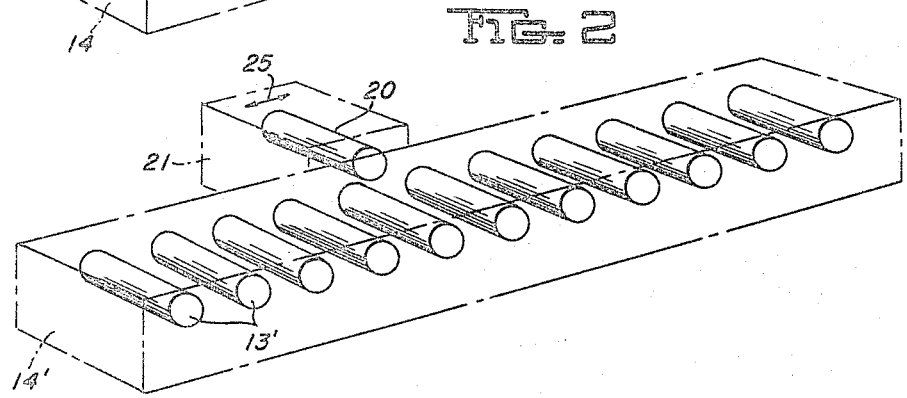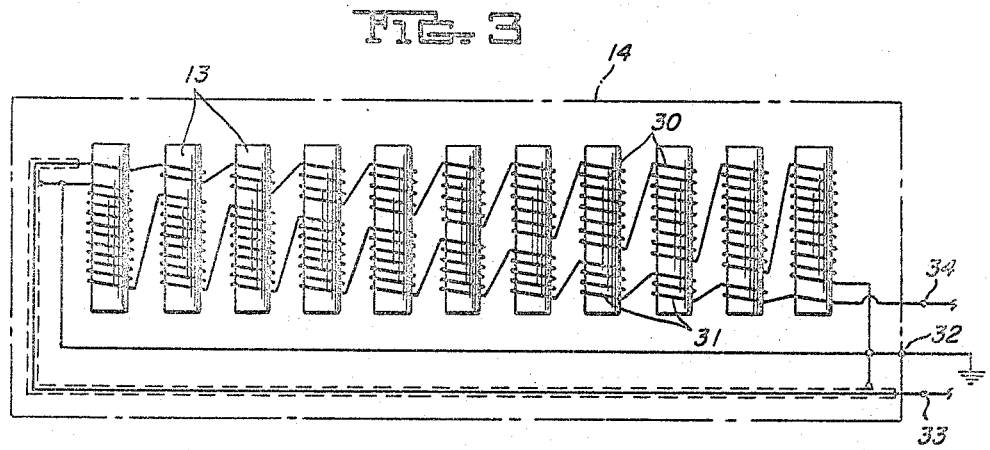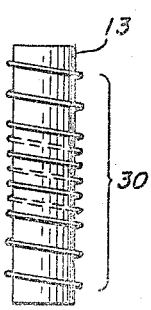
INVENTOR
CLIFFORD L. SEALE
BY Donald G. Dalton
Attorney

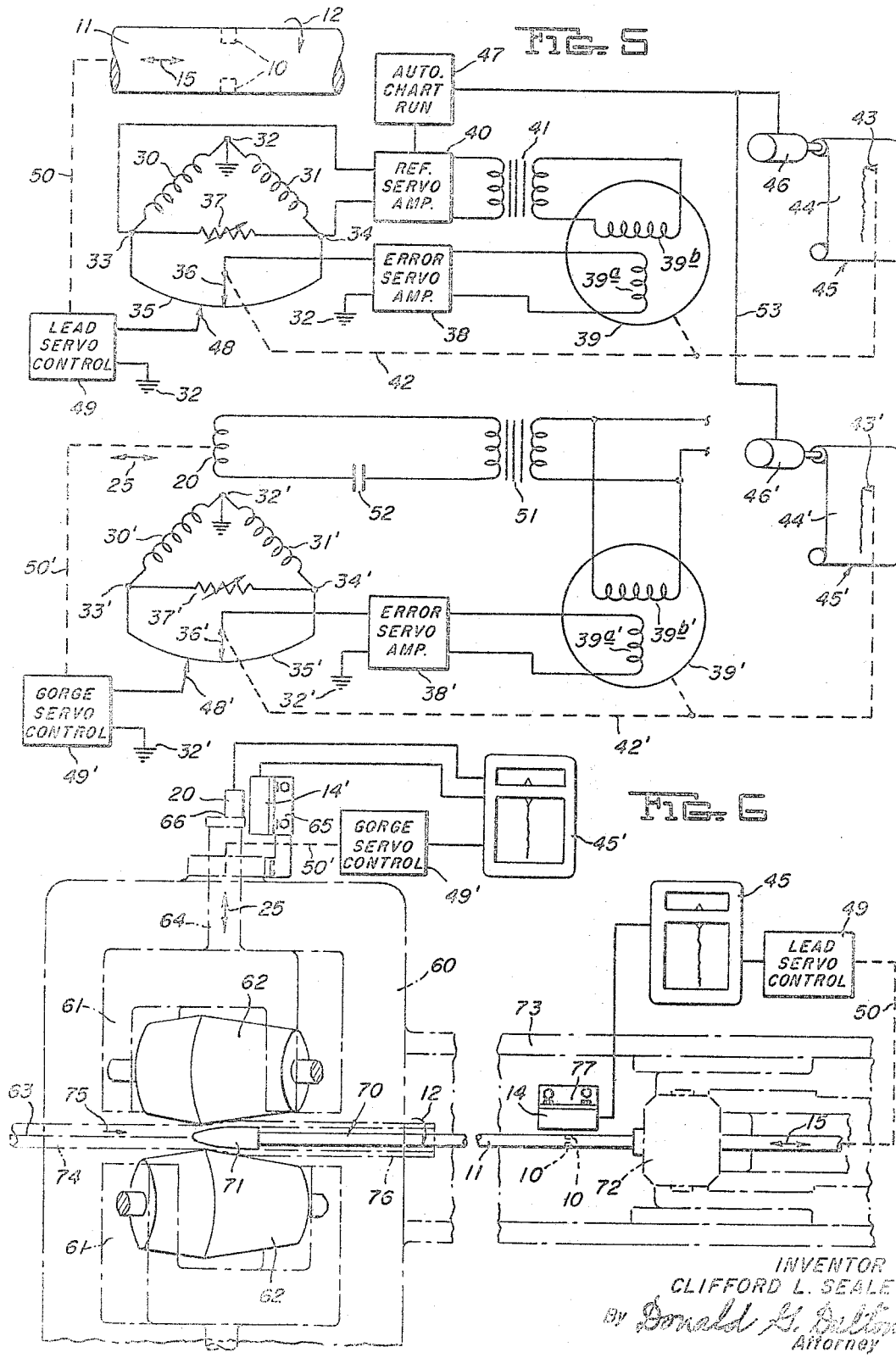

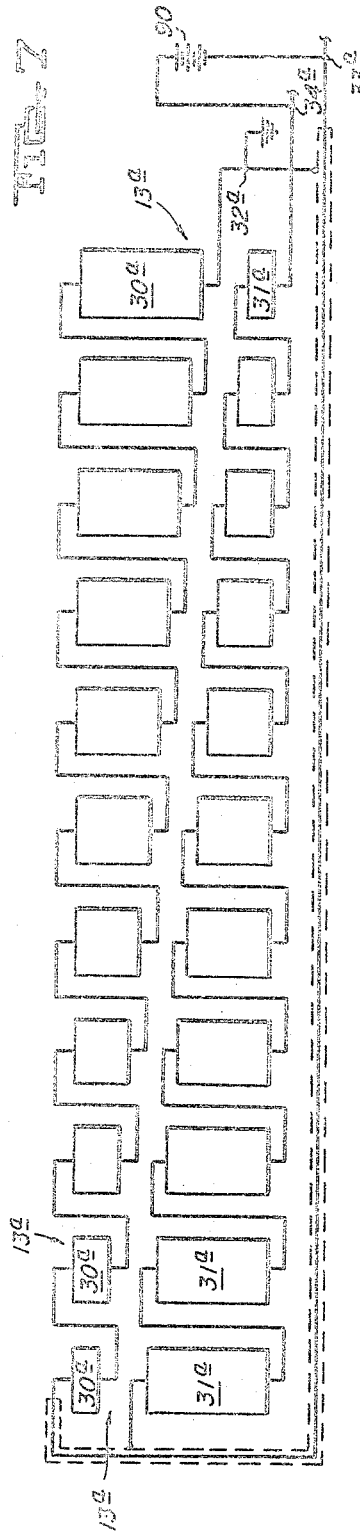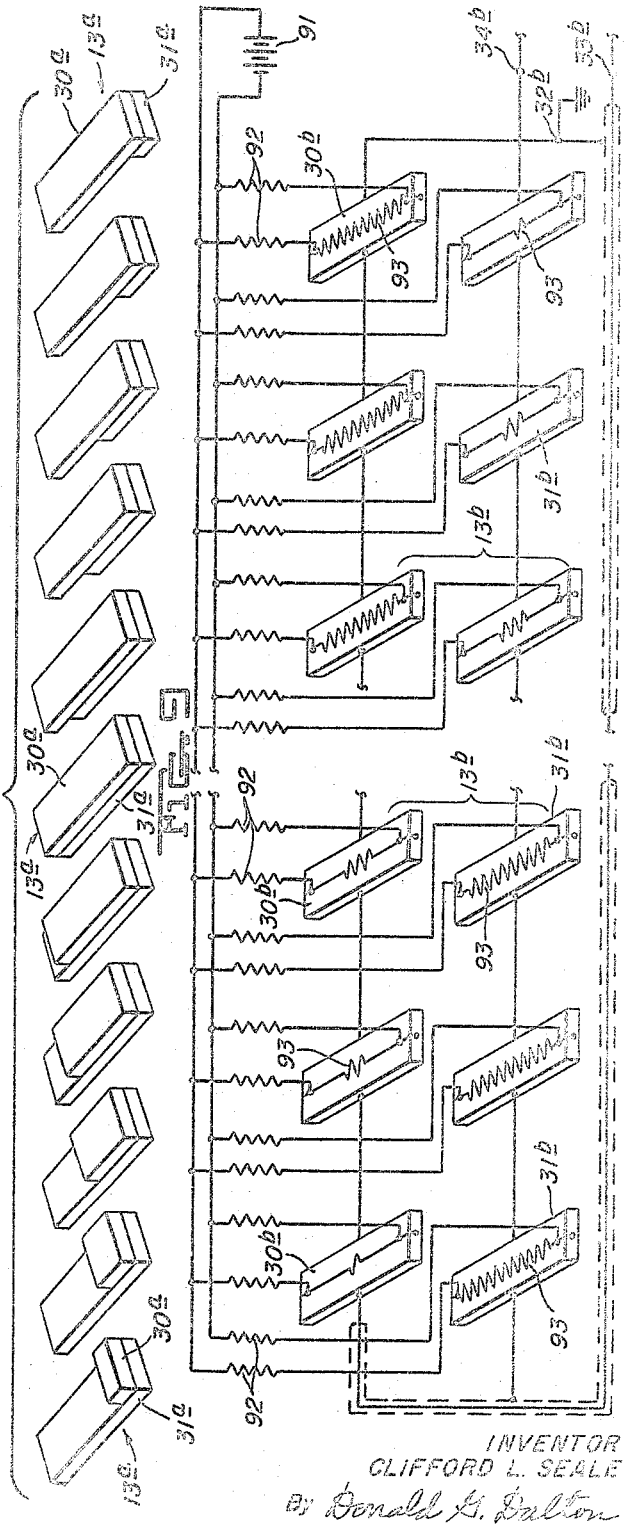

3,332,009
APPARATUS FOR DETECTING THE RELATIVE LOCATION OF A MEMBER IN A SELECTED COORDINATE DIRECTION
Clifford L. Seale, Canal Winchester, Ohio, assignor, by mesne assignments, to United States Steel Corporation, Pittsburgh, Pa., a corporation of Delaware
Filed Nov. 4, 1963, Ser. No. 321,145
15 Claims. (Cl. 324—34)

This invention relates to apparatus for detecting the location of a member in a selected coordinate direction. It is particularly useful for providing a response dependent upon the location of the member in a given direction without any physical contact between the member and the detecting apparatus. The present apparatus is advantageous for use with a member that may move slightly in directions perpendicular to the direction in which its location is to be measured; not only because of the fact that the detecting apparatus may be spaced from the member and thus avoid contact with it, but also because the accuracy of the detecting apparatus is not affected by such movement of the member.

Typical apparatus according to the present invention for detecting the relative location of a member in a selected coordinate direction comprises means positioned by the member for providing a magnetic field; a plurality of detecting means responsive to the magnetic field, each comprising means for providing a plurality of electrical outputs having a fixed ratio of amplitudes, the amplitude ratios in the respective detecting means differing in a predetermined manner from the ratios in other said detecting means, each detecting means being positioned at a different location in the coordinate direction; and means connected to the plurality of detecting means, sensitive to the ratio of amplitudes of the electrical outputs therefrom, for providing a response dependent upon the location of the magnetic field relative to the detecting means in the coordinate direction.

Each detecting means may comprise a plurality of Hall elements, magnetoresistors, or coils. Where coils are used the source of magnetic field should be one that varies in intensity, as provided by an electromagnet supplied with a varying current such as alternating current, or as provided by a magnetic source moving perpendicularly to the coordinate direction.

Suitable detecting means may each comprise a pair of Hall elements, the ratio of the voltage provided in the first Hall element to the voltage provided in the second Hall element of each pair by the same magnetic field differing in a predetermined manner from the ratios in other pairs of Hall elements. The ratios are easily controlled by adjusting the exciting currents of the individual Hall elements for different sensitivities.

Other suitable detecting means may each comprise a pair of magnetoresistors, the ratio of the resistance of the first magnetoresistor to the resistance of the second magnetoresistor of each pair when in the same magnetic field differing in a predetermined manner from the ratios in other pairs of magnetoresistors.

Still other suitable detecting means may each comprise a pair of coils the ratio of the number of turns in the first coil to the number of turns in the second coil of each pair differing in a predetermined manner from the ratios in other pairs of coils. The pair of coils preferably is positioned coaxially and concentrically with the common axis substantially perpendicular to the coordinate direction.

In the above forms of detecting means, the first Hall elements, the first magnetoresistors, or the first coils are connected in series, as are the second devices of each pair, and means are connected to the first and second devices, sensitive to the ratio of the total voltage or resistance in the first devices to that in the second devices as affected by the magnetic field, for providing a response, such as a visible indication, a graphic record, or a control adjustment, dependent upon the location of the magnetic field relative to the detecting means in the coordinate direction.

The most common type of coordinate direction is a straight line, but other forms of coordinate direction are also possible. For example, a polar coordinate system is appropriate for detecting the location of a rotatable member or of a member mounted so as to be pivotable within certain limits. The coordinate direction is along the arc of a circle and the detecting means are positioned along the arc.

In the apparatus described herein, the magnetic field is provided by a device positioned on a movable member and the detecting means are positioned on a fixed member. Obviously the positions could be interchanged where convenient. Also the member on which the magnetic field producing device is positioned and the member on which the detecting means are positioned may both be movable. In any arrangement the apparatus detects the relative locations of the magnetic field and the detecting means, and thus the relative positions of the members on which the magnetic device and the detecting means are positioned.

In the drawings:
FIGURE 1 is a diagrammatic perspective view of a typical form of detecting apparatus according to the present invention.
FIGURE 2 is a view similar to FIGURE 1 of another typical form of detecting apparatus according to this invention.
FIGURE 3 is a schematic plan view of the magnetic field detecting means of FIGURES 1 and 2.
FIGURE 4 is a diagrammatic plan view schematically illustrating the preferred coaxial and concentric arrangement of the pair of coils comprising one of the detecting means of FIGURES 1, 2 and 3.
FIGURE 5 is a schematic diagram of typical apparatus according to the present invention showing significant details of the electrical circuitry therein.
FIGURE 6 is a diagrammatic plan view of the apparatus of FIGURE 5 showing a typical arrangement for recording and controlling the lead and gorge in the fabrication of seamless tubes.
FIGURE 7 is a schematic plan view (similar to FIGURE 3) of an alternative form of magnetic field detecting means that may be used in the detecting apparatus of FIGURES 1 and 2;
FIGURE 8 is a diagrammatic perspective view illustrating a preferred arrangement of the pairs of magnetoresistors of FIGURE 7; and
FIGURE 9 is a schematic perspective view of another alternative form of magnetic field detecting means that may be used in the detecting apparatus of FIGURES 1 and 2.

Referring to FIGURE 1, typical detecting apparatus according to this invention includes a permanent magnet 10 held in a radial position in a mandrel 11, which rotates as is indicated at 12. A plurality of detecting means 13 are distributed in fixed locations in an enclosure 14 along a line parallel to the axis of the mandrel 11 adjacent to the magnet 10. Each detecting means 13 comprises a plurality of elements responsive to the field provided by the magnet 10 for providing a plurality of electrical outputs having a fixed ratio of amplitudes, the amplitude ratios in the respective detecting means 13 differing in a predetermined manner from the ratios in other detecting means 13. Typical detecting means 13 may include such devices as Hall elements, magnetoresistors, and coils. Any movement of the mandrel 11 in the direction along its axis of rotation as indicated at 15 changes the position of the magnetic field of the magnet 10 relative to the array of detecting means 13 and thus changes the ratio of the amplitudes of the electrical outputs from the detecting means 13.

FIGURE 2 shows a somewhat similar form of detecting apparatus in which a reference coil 20 mounted in a housing 21 is supplied with a varying current, such as alternating current, to form an electromagnet providing a varying magnetic field. A plurality of detecting means 13', which may be similar to the detecting means 13 in FIGURE 1, mounted in an enclosure 14', are distributed in fixed locations along a line in the direction of the movement to be measured as indicated at 25. The electromagnet 20 preferably is positioned as shown with its axis perpendicular to the direction of the movement to be measured 25. Any movement of the housing 21 and electromagnet 20 in the direction 25 changes the ratio of amplitudes of the electrical outputs from the plurality of detecting means 13', since it changes the position of the magnetic field of the electromagnet 20 relative to the array of detecting means 13'.

Where the detecting means 13' comprise Hall elements or magnetoresistors, the magnetic field from the electromagnet 20 does not need to vary in intensity; so it may be supplied with ordinary direct current, or a permanent magnet may be used instead of the electromagnet 20. A permanent magnet or an electromagnet of constant intensity may be used also where the detecting means comprise a plurality of coils, since the strength of the magnetic field affecting the detecting means 13' may be varied by varying the reluctance of the path between the magnet 20 and the detecting means 13', as by rotating or otherwise moving magnetic shielding material in and out of the path.

FIGURE 3 shows schematically the general arrangement and electrical connections of detecting means 13 in the enclosure 14, where each detecting means 13 comprises a pair of coils 30 and 31. As is indicated schematically, the ratio of the number of turns in the first coil 30 to the number of turns in the second coil 31 of each pair differs in a predetermined manner from the ratios in other pairs, increasing from left to right in the arrangement shown in FIGURE 3. FIGURE 3 also shows the first coils 30 connected in series, from 32 to 33, and the second coils 31 connected in series, from 32 to 34. In order to show clearly the electrical connections, FIGURE 3 depicts the coils 30 and 31 as being separated. For optimum accuracy, however, it is preferred that the coils 30 and 31 not only be coaxial as shown in FIGURE 3 but also concentric.

FIGURE 4 shows diagrammatically the preferred coaxial and concentric arrangement of the coils 30 and 31 in one of the detecting means 13, the first coil 30 being represented by the solid lines and the second coil 31 being represented by the dashed lines in FIGURE 4.

As FIGURE 3 suggests, it is generally desirable that the total number of turns in each pair of coils 30 and 31 be substantially the same so that the sensitivities of all of the detecting means 13 will be substantially equal. To provide equal sensitivity throughout the detecting means 13, however, it is necessary in some cases to have a larger total number of turns in the coils 30 and 31 of the detecting means 13 at and near each end of the array. Other variations may also be desirable in certain cases. Optimum variations in the total number of turns and in the ratios of turns to obtain either linear or specific nonlinear characteristics are readily determined experimentally.

FIGURE 5 shows significant details of typical electrical circuitry employed with the detecting apparatus of FIGURES 1–4 in recording and controlling the lead and gorge in the fabrication of seamless tubes. FIGURE 6 shows a typical physical arrangement of the apparatus.

FIGURE 7 shows schematically the general arrangement and electrical connections of an alternative form of detecting means 13a that may be substituted for the detecting means 13 shown in enclosure 14 in FIGURE 3. Each detecting means 13a comprises a pair of magnetoresistors 30a and 31a. The magnetoresistors 30a and 31a preferably are made of the same material and have equal cross-sectional areas. As is indicated schematically, the ratio of the length of the first magnetoresistor 30a to the length of the second magnetoresistor 31a of each pair differs in a predetermined manner from the ratios in other pairs, increasing from left to right in the arrangement shown in FIGURE 7. FIGURE 7 also shows the first magnetoresistor 30a connected in series, from 32a to 33a, and the second magnetoresistors 31a connected in series, from 32a to 34a. A direct current source 90 is connected across all of the series magnetoresistors 30a, 31a at 33a and 34a. The voltage across each magnetoresistor 30a, 31a is of course proportional to its resistance at any given instant. In order to show clearly the electrical connections, FIGURE 7 depicts the magnetoresistors 30a and 31a as being separated. For optimum accuracy, however, it is preferred that each pair of magnetoresistors 30a, 31a not only be in the same position from left to right as shown in FIGURE 7 but also substantially contiguous.

FIGURE 8 shows a preferred arrangement of the magnetoresistors 30a and 31a in the detecting means 13a. Each magnetoresistor 30a is located on its associated magnetoresistor 31a with their front faces aligned vertically and in the same plane, and is held in place by a nonconductive adhesive.

As FIGURE 7 suggests, it is generally desirable that the total length of each pair of magnetoresistors 30a and 31a be substantially the same so that the sensitivities of all of the detecting means 13a will be substantially equal. To provide equal sensitivities throughout the detecting means 13a, however, it is necessary in some cases to have a greater total length in the magnetoresistors 30a and 31a of the detecting means 13a at and near each end of the array. Other variations may also be desirable in certain cases. Optimum variations in the total lengths and in the ratios of the lengths to obtain either linear or specific nonlinear characteristics are readily determined experimentally.

The detecting means 13a of FIGURE 7 may be connected in the circuit of FIGURE 5 by connecting the points 32a, 33a, 34a to the points 32, 33, 34, respectively.

FIGURE 9 shows schematically the general arrangement and electrical connections of another alternative form of detecting means 13b that may be substituted for detecting means 13 in enclosure 14 in FIGURE 3. Each detecting means 13b comprises a pair of Hall elements 30b and 31b, which are excited by a direct current source 91 through isolating resistors 92. The Hall elements 30b, 31b preferably are all substantially identical. As is indicated schematically, the ratio of the exciting current in the first Hall element 30b to the exciting current in the second Hall element 31b of each pair differs in a predetermined manner from the ratios in other pairs because of the different resistances of shunt resistors 93 across the different Hall elements 30b, 31b. The ratio of the exciting current in the Hall element 30b to the exciting current in the Hall element 31b increases from left to right in the arrangement shown in FIGURE 9. FIGURE 9 also shows the first Hall elements 30b connected in series, from 32b to 33b, and the second Hall elements 31b connected in series, from 32b to 34b. In order to show clearly the electrical connections, FIGURE 9 depicts the Hall elements 30b and 31b as being separated. For optimum accuracy, however, it is preferred that each pair of Hall elements 30b, 31b not only be in the same position from left to right as shown in FIGURE 9 but also substantially contiguous. The Hall elements 30b, 31b preferably are arranged similarly to the magnetoresistors 30a, 31a shown in FIGURE 8 with their front faces (and their rear faces) aligned vertically and in the same plane.

As FIGURE 9 suggests, it is generally desirable that the total exciting current in each pair of Hall elements 30b, and 31b be substantially the same so that the sensitivities of all of the detecting means 13b will be substantially equal. To provide equal sensitivity throughout the detecting means 13b, however, it is necessary in some cases to have a larger total exciting current in the Hall elements 30b and 31b of the detecting means 13b at and near each end of the array. Other variations may also be desirable in certain cases. Optimum variations in the total exciting currents and in the ratios of the exciting currents to obtain either linear or specific nonlinear characteristics are readily determined experimentally.

The detecting means 13b of FIGURE 9 may be connected in the circuit of FIGURE 5 by connecting points 32b, 33b, 34b to points 32, 33, 34, respectively.

A pair of permanent magnets 10 mounted in a mandrel 11 with the axis of their poles along a diameter of the mandrel 11 rotate, as is indicated at 12, thus providing a magnetic field of varying intensity that is strongest in the plane in which the magnets 10 rotate. The position of the magnets 10 and the mandrel 11 in the direction of the axis of the mandrel 11, as is indicated at 15, determines the ratio of voltages induced in the first coils 30 of the detecting means 13 as in FIGURES 3 and 4, and in the second coils 31 thereof. In FIGURE 5, 30 represents all of the first coils connected in series between the points 32 and 33 as in FIGURE 3, while 31 represents all of the second coils connected in series between the points 32 and 34 as in FIGURE 3. Connected across the points 33 and 34 is a slide wire 35, having a movable contact 36 connected thereto, forming a Wheatstone bridge circuit with the coils 30 and 31. A variable resistor 37 also connected between the points 33 and 34 is used to adjust the sensitivity of the bridge circuit.

An error servo amplifier 38 connected to the movable contact 36 and the ground 32 receives and amplifies any difference in voltage between the points 36 and 32, and feeds the amplified voltage to the detector winding 39a of a two-phase servo motor 39. A reference servo amplifier 40 connected to the points 33 and 34 receives and amplifies the total voltage across the coils 30 and 31, supplying the amplified voltage to a matching transformer 41, which is connected to the reference winding 39b of the servo motor 39. Depending upon its polarity, any voltage between the points 32 and 36 causes the servo motor 39 to move the movable contact 36, as is indicated by the dashed line 42, to the point on the slide wire 35 having the same potential as the grounded point 32 between the coils 30 and 31. At this point the bridge is balanced, and the servo motor 39 stops. As is further indicated by the dashed line 42, the servo motor 39 also controls the position of a pen 43, which indicates on the chart 44 of a recorder 45 the position of the movable contact 36. Since the position of the movable contact 36 when the bridge is balanced depends on the ratio of the voltages generated by the rotating magnets 10 in the coils 30 and 31, the recording pen 43 provides a record of the position along its axis of the mandrel 11 in which the magnets 10 are mounted.

The voltage across the points 33 and 34, which is substantially constant when the mandrel 11 is rotating, and which is zero when the mandrel 11 is not rotating, controls the connection of the driving voltage to the chart motor 46 of the recorder 45. The voltage between the points 33 and 34 is amplified by the reference servo amplifier 40 and the amplified voltage controls an automatic chart run circuit 47, which is a conventional relay circuit, connecting power to the chart motor 46 when actuating voltage is being received from the reference servo amplifier 40 and disconnecting it in the absence of such voltage.

Instead of the null balance recording system described above for recording the axial position of the mandrel 11, or in addition thereto, a similar null balance servo system may be used to control the position of the mandrel 11. A typical control system includes a movable contact 48 whose position on the slide wire 35 is adjusted by an operator to the position at which the bridge is balanced with the rotating mandrel 11 at a predetermined desired axial position. A lead servo control 49, comprising a conventional null balance servo system such as the one described for controlling the recording pen 43, is connected to the adjustable contact 48 and the ground 32. Any deviation of the mandrel 11 from the position at which the bridge is balanced provides a voltage between the points 32 and 48 which, depending upon its polarity, causes the lead servo control 49 to move the mandrel 11, as is indicated at 15, in the proper direction back to the desired balance position.

In the lower portion of the circuit in FIGURE 5, a reference coil or electromagnet 20 is energized by a conventional alternating current source such as a commercial 117 volt 60 cycle AC supply, which also energizes the reference phase winding 39b' of the two-phase servo motor 39'. The primary winding of a step down transformer 51 is connected to the alternating current supply voltage and the secondary of the step-down transformer 51 is connected to the electromagnet 20 through a capacitor 52, which corrects for minor phase shifts of less than 90° in the overall system. Without the correction provided by the capacitor 52 the small phase shift would cause the null position to be unduly broad and the operation of the servo motor 39' to be sluggish.

The electromagnet 20 provides a magnetic field of varying intensity that is strongest along its axis. The position of the electromagnet 20 in the desired coordinate direction 25 (see also FIGURE 2) determines the ratio of voltages induced in the first coils 30' of the detecting means 13', and in the second coils 31' thereof. In FIGURE 5, 30' represents all of the first coils connected in series between the points 32' and 33', while 31' represents all of the second coils connected in series between the points 32' and 34'. Connected across the points 33' and 34' is a slide wire 35', having a movable contact 36' connected thereto, forming a Wheatstone bridge circuit with the coils 30' and 31'. A variable resistor 37' also connected between the points 33' and 34' is used to adjust the sensitivity of the bridge circuit. In calibrating the bridge, the sensitivity is increased by reducing the resistance in the resistor 37'.

An error servo amplifier 38' connected to the movable contact 36' and the ground 32' receives and amplifies any difference in voltage between the points 36' and 32', and feeds the amplified voltage to the detector winding 39a' of a two-phase servo motor 39'. Depending upon its polarity, any voltage between the points 32' and 36' causes the servo motor 39' to move the movable contact 36', as is indicated by the dashed line 42', to the point on the slide wire 35' having the same potential as the grounded point 32' between the coils 30' and 31'. At this point the bridge is balanced, and the servo motor 39' stops. As is further indicated by the dashed line 42', the servo motor 39' also controls the position of a pen 43', which indicates on the chart 44' of a recorder 45' the position of the movable contact 36'. Since the position of the movable contact 36' when the bridge is balanced depends on the ratio of the voltages generated by the electromagnet 20 in the coils 30' and 31', the recording pen 43' provides a record of the position of the electromagnet 20 in the direction 25.

The chart motor 46' of the recorder 45' may be started and stopped at the same times as the chart motor 46 of the recorder 45 by the automatic chart run circuit 47, as is indicated by the connection 53.

Instead of the null balance recording system described above for recording the position of the electromagnet 20, or in addition thereto, a similar null balance servo system may be used to control the position of the member on which the electromagnet 20 is mounted. A typical control system includes a movable contact 48' whose position on the slide wire 35' is adjusted by an operator to the position at which the bridge is balanced with the electromagnet 20 at a predetermined location in the direction 25. A gorge servo control 49', comprising a conventional null balance servo system such as the one described for controlling the recording pen 43', is connected to the adjustable contact 48' and the ground 32'. Any deviation of the electromagnet 20 from the position at which the bridge is balanced provides a voltage between the points 32' and 48' which, pedending upon its polarity, causes the gorge servo control 39' to move the electromagnet 20, as is indicated at 25, in the proper direction back to the desired balance position.

FIGURE 6 shows a typical arrangement for recording and controlling the lead and gorge in the fabrication of seamless tubes, by means of the apparatus of FIGURES 1–5. Typical equipment for fabricating seamless tubes includes a mill housing 60 in which are mounted a pair of roll chocks 61, each of which rotatably supports a roll 62, as shown in FIGURE 6. The roll chocks 61 are movable in the direction indicated at 25 by conventional position adjusting means, not shown, which maintain the chocks 61 and the rolls 62 equidistant from a center line 63 at all positions. Attached to each roll chock 61 is a chock shaft 64, which helps to align the chock 61. The position of each chock shaft 64 in the direction 25 is proportional to the distance of the roll chocks 61 and the rolls 62 from the center line 63, and thus is also proportional to the narrowest distance between the two rolls 62, which is commonly called the "gorge."

To measure the gorge in the equipment of FIGURE 6 an enclosure 14' containing a plurality of detecting means as in FIGURE 2 is rigidly attached at 65 to the mill housing 60 adjacent to a reference coil or electromagnet 20, which is rigidly attached at 66 to the chock shaft 64. Likewise, as in FIGURE 2, the electromagnet 20 of FIGURE 6, is positioned with its axis perpendicular to the direction of the movement to be measured, namely, that of chock shaft 64 in FIGURE 6. The electromagnet 20 and the coils 30' and 31' in the enclosure 14' are connected as shown in FIGURES 3 and 5 to the recorder 45', which records the position of the chock shaft 64, and to the gorge servo control 49' which adjusts the position of the chock shafts 64, the roll chocks 61, and the rolls 62, as is indicated schematically at 50'. The other components shown in the lower part of FIGURE 5 are housed in the recorder 45'.

A piercer 70, comprising a piercer plug 71 and a mandrel 11 rigidly attached thereto, is held and positioned by a thrust block 72, which is adjustably mounted on a piercer outlet table 73. The position of the thrust block 72 on the piercer outlet table 73 is controlled by conventional adjusting means, not shown, in the direction 15. As is shown in FIGURE 6, the tip of the piercer plug 71 projects beyond the narrowest point between the rolls 62. The distance between the tip of the piercer plug 71 and the narrowest point between the rolls 62 is commonly called the "lead."

To fabricate tubing, a billet 74 of material, such as steel at about 2300° F., is positioned as shown in FIGURE 6, centered around the center line 63, and is fed as is indicated at 75 between the rolls 62 and against the piercer plug 71, the rolls 62 being driven to rotate the billet 74 and the piercer 70, as is indicated at 12. To provide a preselected outer diameter and a preselected wall thickness in the fabricated tubing 76, the gorge of the rolls 62 and the lead of the piercer 70 must be kept within certain limits that are ordinarily determined experimentally.

To record and control the lead in the equipment of FIGURE 6, apparatus as shown in FIGURES 1 and 5 is employed. An enclosure 14 containing an array of detecting means 13 as in FIGURES 1, 3, 4, and 5 is fixedly attached at 77 to the piercer outlet table 73 adjacent to a pair of permanent magnets 10 mounted in sleeves of nonmagnetic material such as brass, too small to be shown, in the mandrel 11 of the piercer 70. The magnets 10 are positioned with their poles along a diameter of the mandrel 11. The coils 30 and 31 of the detecting means in the enclosure 14 are connected to the recorder 45, which records the position of the magnets 10 and thus of the lead of the piercer 70, and to the lead servo control 49, which controls the lead by adjusting the position of the thrust block 72, as is indicated schematically at 50. The recorder 45 houses the other components shown in the upper part of FIGURE 5.

At typical speeds of rotation of the roll 62, the billet 74 and the piercer 70 rotate about 11 times per second, causing the two magnets 10 to generate in the coils 30 and 31 a signal having approximately 22 pulses per second, each pulse lasting about 0.01 second. Thus, it is convenient to use a 25 cycle servo motor, which is readily available, as the two-phase servo motor 39 shown in FIGURE 5. The frequency of the pulses can be increased by using more magnets radially mounted at equal angles around the mandrel 11 in the same plane.

Lateral vibration in the mandrel 11 does not affect the accuracy of detection of its position in the axial direction, because the maximum strength of the magnetic field remains in the same plane perpendicular to the axis. Even if the mandrel 11 should bend slightly where the magnets 10 are mounted, or if the magnets 10 should be mounted slightly out of line, the detecting apparatus would still function accurately, although the sharpness of its sensitivity might be slightly reduced because the magnetic field would be broader in the axial direction.

While the forms of the invention herein disclosed constitute preferred embodiments, it is not intended to describe or mention all of the possible equivalent forms or ramifications of the invention. It is to be understood that the words used are terms of description rather than of limitation, and that various changes may be made without departing from the spirit or scope of the invention.

I claim:
1. Apparatus for detecting the relative location of a member in a selected coordinate direction comprising means positioned by said member for providing a magnetic field, a plurality of detecting means responsive to said magnetic field, each said detecting means comprising means for providing a plurality of electrical outputs having a fixed ratio of amplitudes, the amplitude ratios in the respective detecting means differing in a predetermined manner from the ratios in other said detecting means, each detecting means being positioned at a different location in said coordinate direction and means connected to said plurality of detecting means, sensitive to the ratio of amplitudes of the electrical outputs from said plurality of detecting means, for providing a response dependent upon the location of said magnetic field relative to said detecting means in said coordinate direction.

2. Apparatus according to claim 1, wherein said magnetic field varies in intensity.

3. Apparatus according to claim 1, wherein said magnetic field is provided by a magnetic source moving perpendicularly to said coordinate direction.

4. Apparatus according to claim 1, wherein said magnetic field is provided by an electromagnet supplied with a varying current.

5. Apparatus according to claim 1, wherein each said detecting means comprises a plurality of Hall elements.

6. Apparatus according to claim 1, wherein each said detecting means comprises a plurality of magnetoresistors.

7. Apparatus according to claim 1, wherein each said detecting means comprises a plurality of coils.

8. Apparatus for detecting the relative location of a member in a selected coordinate direction comprising means positioned by said member for providing a magnetic field, a plurality of detecting means responsive to said magnetic field, each said detecting means being positioned at a different location in said coordinate direction, each said detecting means comprising a pair of Hall elements, the ratio of the voltage provided in the first Hall element to the voltage provided in the second Hall element of each said pair by the same magnetic field differing in a predetermined manner from the ratios in other said pairs of Hall elements, the outputs of said first Hall elements being connected in series and the outputs of said second Hall elements being connected in series and means connected to said first Hall elements and to said second Hall elements, sensitive to the ratio of the total voltage provided in said first Hall elements to the voltage provided in said second Hall elements by said magnetic field, for providing a response dependent upon the location of said magnetic field relative to said detecting means in said coordinate direction.

9. Apparatus for detecting the relative location of a member in a selected coordinate direction comprising means positioned by said member for providing a magnetic field, a plurality of detecting means responsive to said magnetic field, each said detecting means being positioned at a different location in said coordinate direction, each said detecting means comprising a pair of magnetoresistors, the ratio of the resistance of the first magnetoresistor to the resistance of the second magnetoresistor of each said pair when in the same magnetic field differing in a predetermined manner from the ratios in other said pairs of magnetoresistors, said first magnetoresistors being connected in series and said second magnetoresistors being connected in series and means connected to said first magnetoresistors and to said second magnetoresistors, sensitive to the ratio of the total resistance of said first magnetoresistors to the total resistance of said second magnetoresistors as affected by said magnetic field, for providing a response dependent upon the location of said magnetic field relative to said detecting means in said coordinate direction.

10. Apparatus for detecting the relative location of a member in a selected coordinate direction comprising means positioned by said member for providing a magnetic field of varying intensity, a plurality of detecting means responsive to said magnetic field, each said detecting means comprising a pair of coils positioned with their axes substantially perpendicular to said coordinate direction, the ratio of the number of turns in the first coil to the number of turns in the second coil of each said pair differing in a predetermined manner from the ratios in other said pairs of coils, said first coils being connected in series and said second coils being connected in series, each said pair of coils being positioned at a different location in said coordinate direction and means connected to said first coils and to said second coils, sensitive to the ratio of the voltage induced in said first coils to the voltage induced in said second coils by said magnetic field, for providing a response dependent upon the location of said magnetic field relative to said detecting means in said coordinate direction.

11. Apparatus for detecting the relative location of a member in a selected coordinate direction comprising means positioned by said member for providing a magnetic field of varying intensity, a plurality of detecting means responsive to said magnetic field, each said detecting means comprising a pair of coaxial and concentric coils positioned with their common axis substantially perpendicular to said coordinate direction, the total number of turns in each said pair of coils being substantially the same, and the ratio of the number of turns in the first coil to the number of turns in the second coil of each said pair differing in a predetermined manner from the ratios in other said pairs of coils, said first coils being connected in series and said second coils being conected in series, each said pair of coils being positioned at a different location in said coordinate direction and means connected to said first coils and to said second coils, sensitive to the ratio of the voltage induced in said first coils to the voltage induced in said second coils by said magnetic field, for providing a response dependent upon the location of said magnetic field relative to said detecting means in said coordinate direction.

12. Apparatus for detecting the relative location of a member in a selected coordinate direction comprising means positioned by said member for providing a magnetic field of varying intensity, a plurality of detecting means responsive to said magnetic field, each said detecting means being positioned at a different location in said coordinate direction, each said detecting means comprising a plurality of coaxial and concentric coils positioned with their common axis substantially perpendicular to said coordinate direction, the ratio of the number of turns in one coil to the number of turns in another coil of each said detecting means differing in a predetermined manner from the ratios in other said detecting means, corresponding coils in said plurality of detecting means being connected in series and means connected to said coils, sensitive to the ratios of the voltages induced in said coils by said magnetic field, for providing a response dependent upon the location of said magnetic field relative to said detecting means in said coordinate direction.

13. Apparatus for detecting the distance between a pair of rolls adjustably mounted on opposite sides of the axis of rotation of material formed into tubes by said rolls in cooperation with a piercer, the mount including a linearly movable member whose position is indicative of the distance between said rolls, and for detecting the position of said piercer along said axis of rotation, comprising a reference coil supplied with alternating current, fixedly attached to said movable member with the axis of said coil perpendicular to the direction in which said member is movable, a first plurality of detecting means responsive to varying magnetic fields, distributed in fixed locations along a line in the direction in which said member is movable adjacent to said reference coil, each said detecting means comprising a pair of coaxial and concentric coils positioned with their common axis substantially perpendicular to the direction in which said member is movable, the total number of turns in each said pair of coils being substantially the same, and the ratio of the number of turns in the first coil to the number of turns in the second coil of each said pair differing in a predetermined manner from the ratios in other said pairs of coils, said first coils being connected in series and said second coils being connected in series, a magnet fixedly attached to the mandrel of said piercer in a plane perpendicular to the axis of the mandrel, a second plurality of detecting means responsive to varying magnetic fields, distributed in fixed locations along a line parallel to the axis of the mandrel adjacent to said magnet, each said detecting means comprising a pair of coaxial and concentric coils positioned with their common axis substantially perpendicular to the axis of the mandrel, the total number of turns in each said pair of coils being substantially the same, and the ratio of the number of turns in the first coil to the number of turns in the second coil of each said pair differing in a predetermined manner from the ratios in other said pairs of coils, said first coils being connected in series and said second coils being connected in series, means connected to said first coils and to said second coils of said first plurality of detecting means, sensitive to the ratio of the voltage induced in said first coils by said reference coil to the voltage induced in said second coils by said reference coil, and connected to said first coils and to said second coils of said second plurality of detecting means, sensitive to the ratio of the voltage induced in said first coils by the rotating magnet to the voltage induced in said second coils by said magnet, for providing a response dependent upon the position of the reference coil in the direction in which said member is movable and the position of the rotataing magnet in the direction of the axis of rotation of the mandrel.

14. Apparatus for detecting the distance between a pair of rolls adjustably mounted on opposite sides of the axis of rotation of material formed into tubes by said rolls in cooperation with a piercer, the mount including a linearly movable member whose position is indicative of the distance between said rolls, comprising a reference coil supplied with alternating current, fixedly attached to said movable member with the axis of said coil perpendicular to the direction in which said member is movable, a plurality of detecting means responsive to varying magnetic fields, distributed in fixed locations along a line in the direction in which said member is movable adjacent to said reference coil, each said detecting means comprising a pair of coaxial and concentric coils positioned with their common axis substantially perpendicular to the direction in which said member is movable, the total number of turns in each said pair of coils being substantially the same, and the ratio of the number of turns in the first coil to the number of turns in the second coil of each said pair differing in a predetermined manner from the ratios in other said pairs of coils, said first coils being connected in series and said second coils being connected in series, means connected to said first coils and to said second coils, sensitive to the ratio of the voltage induced in said first coils by said reference coil to the voltage induced in said second coils by said reference coil, for providing a response dependent upon the position of the reference coil in the direction in which said member is movable.

15. Apparatus for detecting the position along its axis of rotation of a piercer in the fabrication of tubes, comprising a magnet fixedly attached to the mandrel of said piercer in a plane perpendicular to the axis of the mandrel, a plurality of detecting means responsive to varying magnetic fields, distributed in fixed locations along a line parallel to the axis of the mandrel adjacent to said magnet, each said detecting means comprising a pair of coaxial and concentric coils positioned with their common axis substantially perpendicular to the axis of the mandrel, the total number of turns in each said pair of coils being substantially the same, and the ratio of the number of turns in the first coil to the number of turns in the second coil of each said pair differing in a predetermined manner from the ratios in other said pairs of coils, said first coils being connected in series and said second coils being connected in series, means connected to said first coils and to said second coils, sensitive to the ratio of the voltage induced in said first coils by the rotating magnet to the voltage induced in said second coils by said magnet, for providing a response dependent upon the position of the rotating magnet in the direction of the axis of rotation of the mandrel.

No references cited.

WALTER L. CARLSON, *Primary Examiner.*

R. B. WILKINSON, R. J. CORCORAN, *Examiners.*